Figure 1:
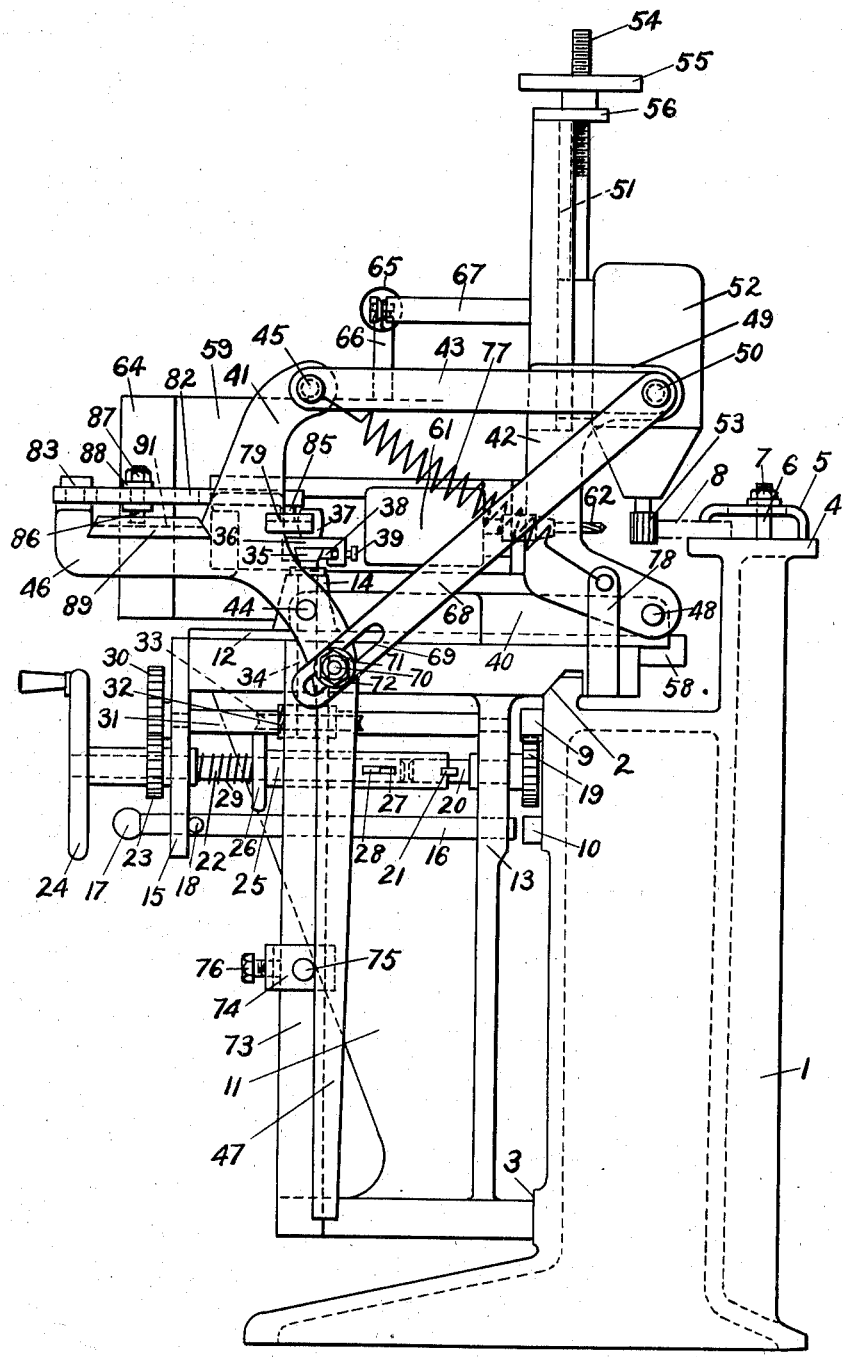

May 31, 1949.　　　　　A. G. S. SANDISON　　　　　2,471,780
MACHINE FOR FABRICATING STRAKES FOR BOAT
CONSTRUCTION OR THE LIKE
Filed Aug. 23, 1944　　　　　　　　　　　　　　5 Sheets-Sheet 1

Alexander G. S. Sandison.
Inventor

Alexander G. S. Sandison
Inventor.

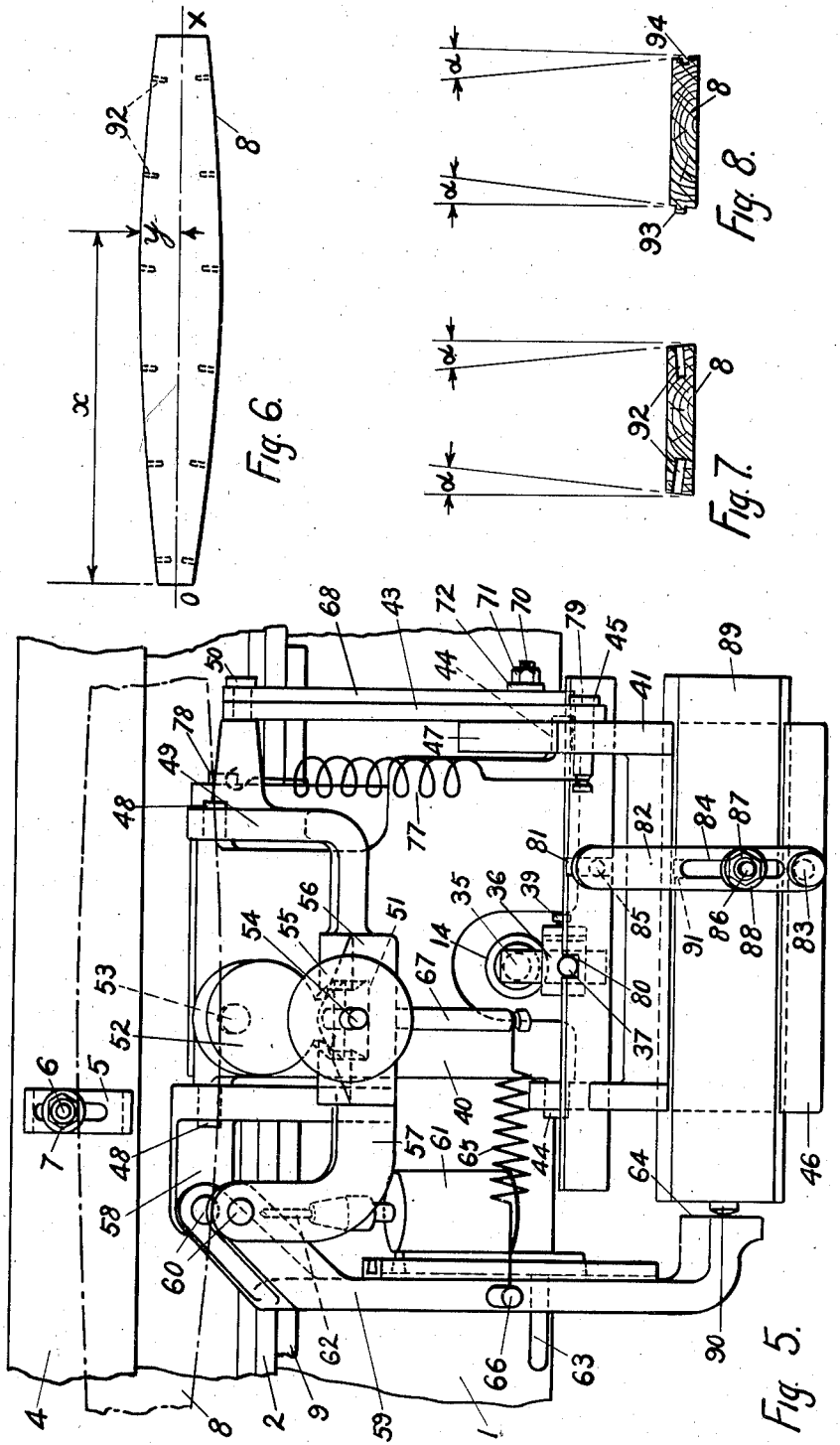

Patented May 31, 1949

2,471,780

UNITED STATES PATENT OFFICE 2,471,780

MACHINE FOR FABRICATING STRAKES FOR BOAT CONSTRUCTION OR THE LIKE

Alexander Greswolde Seymour Sandison, Brantford, Ontario, Canada

Application August 23, 1944, Serial No. 550,738
In Canada January 24, 1944

9 Claims. (Cl. 144—134)

This invention relates to a machine for fabricating strakes for boat construction or the like.

An object of the invention is to provide means whereby strakes of a type capable of assembly to form part or all of the skin of a boat of a certain type may be fabricated with their edges cut to the correct contour and angle of bevel and, if so required, also with holes at the correct angles to receive edge fastenings.

Figure 2:
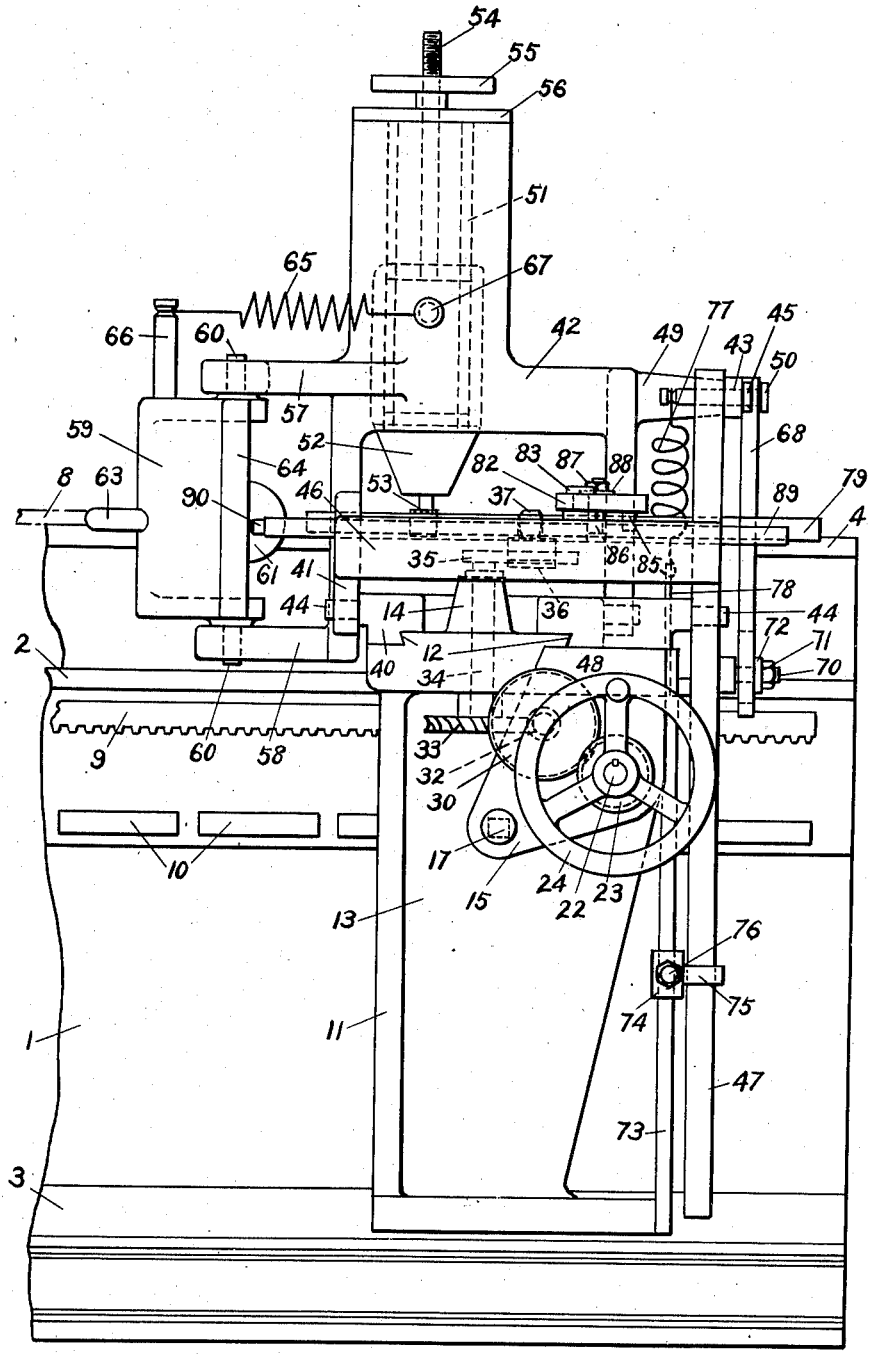
Figure 3:
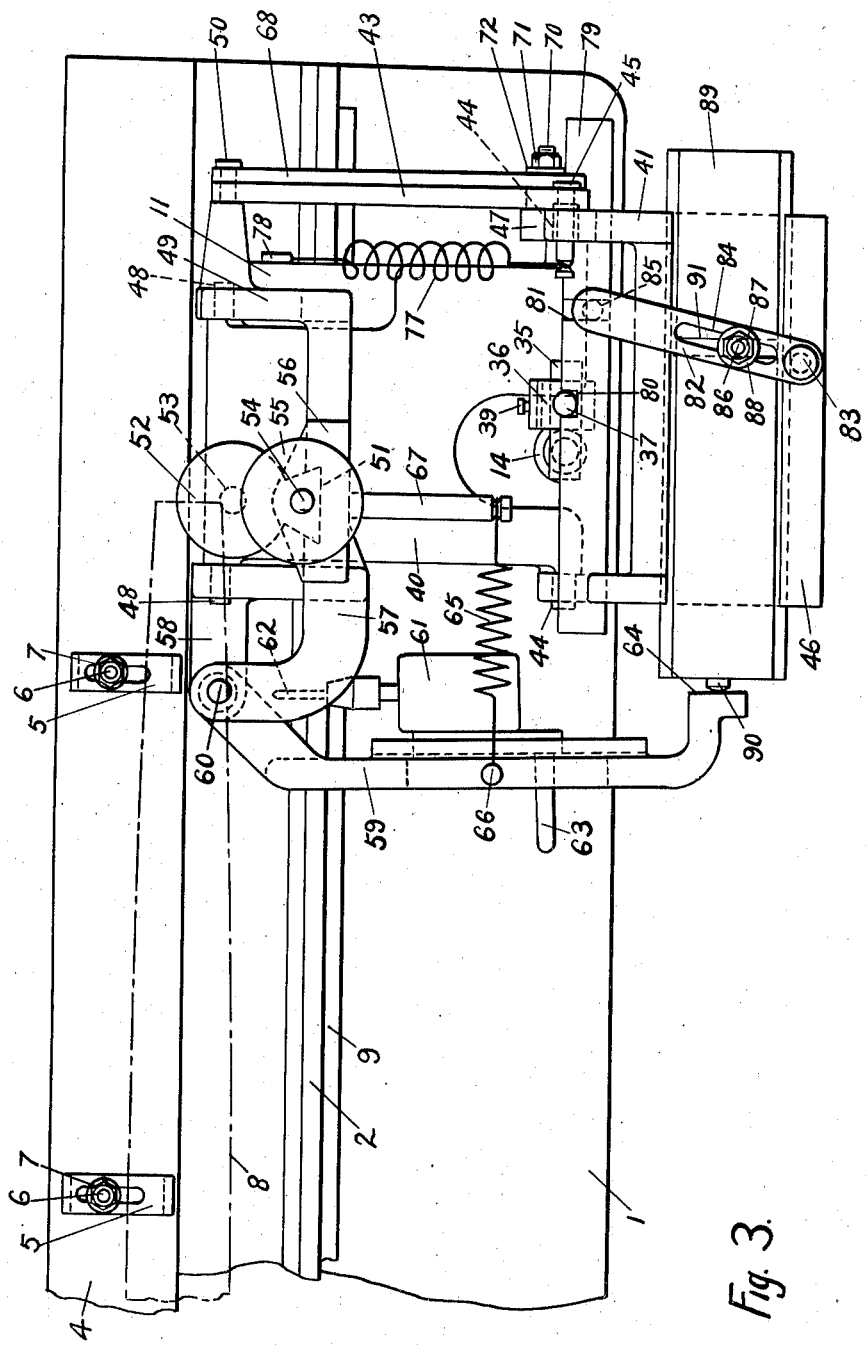
Figure 4:
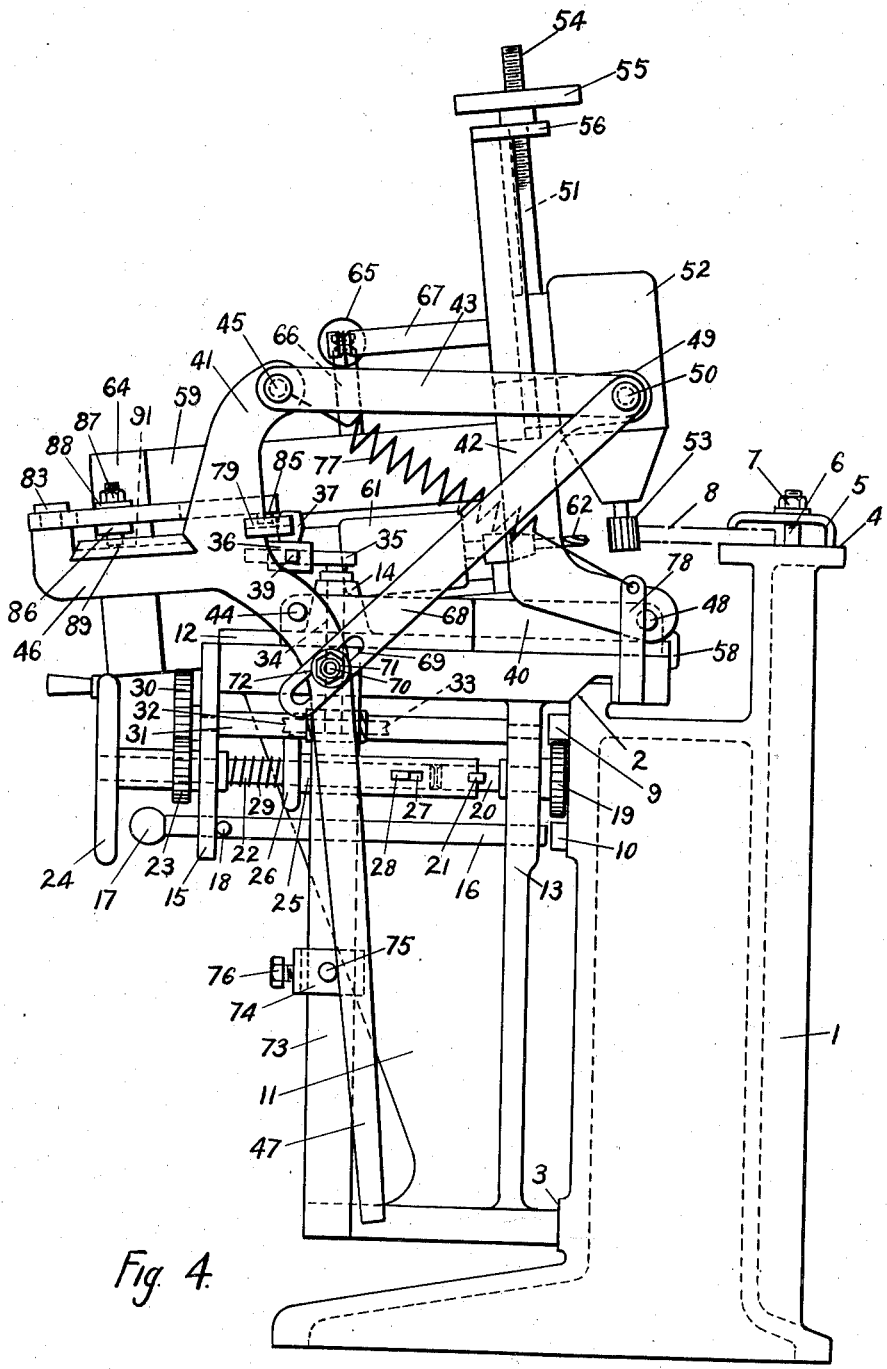

The invention is exemplified in the accompanying diagrammatic drawings in which like components are referred to by like reference numerals and in which:

Fig. 1 is a side elevation of a machine.
Fig. 2 is a front elevation of the machine.
Fig. 3 is a plan view of the machine.
Fig. 4 is a side elevation of the machine with the mechanism in a position different from that shown in Fig. 1.
Fig. 5 is a plan view of the machine with the mechanism in a position different from that shown in Fig. 3.
Fig. 6 is a diagram of a type of strake such as may be formed by the machine.
Fig. 7 is a diagrammatic section of a strake such as may be formed by the machine.
Fig. 8 is a diagrammatic section alternative to that shown in Fig. 7.

To facilitate the description of the direction of operating movement of portions of the mechanism, the part of the machine shown on the left of Figs. 1 and 4 and on the lower portion of Figs. 3 and 5 will be regarded as comprising the front, and the opposite portion the back, of the machine, and the words "right" and "left" where used are to be interpreted as referring to the views shown in Figs. 2, 3 or 5.

Referring to Figs. 1 to 5 inclusive a bed 1 has straight longitudinal ways 2 and 3, and a table 4 with means comprising clamps 5, studs 6, and nuts 7 for clamping the work 8 shown in chain dotted line. Below ways 2 is secured a longitudinal rack 9 and below this rack a series of longitudinally disposed bars 10 of equal length and equally spaced along the bed so that the gaps between their ends are equal. A saddle 11, having transverse ways 12 is slidably mounted on the ways 2 and 3 and has a vertical web 13 located in proximity to the rack 9, and an upwardly extending boss 14 located between the ways 12. An apron piece 15 is secured to the front of the saddle. A transverse bar 16 provided with an operating knob 17 and stop pin 18 is slidably supported by the apron piece 15 and web 13 in such a position that when it is pushed in, its end can engage in the gaps between the bars 10. A pinion 19 meshes with the rack 9 and is mounted on a transverse shaft 20 provided with a key 21 and journalled in the web 13. Another transverse shaft 22 co-axial with shaft 20 is journalled in the apron piece 15 and has secured to it on its front end a change gearwheel 23 and handwheel 24, and at its rear end a slidable sleeve 25 provided with a flange-type handle 26 and a slot 27 which slidably engages a key 28 secured to the shaft 22. The end of shaft 20 locates in the rear end of the sleeve 25, which is provided with a slot to engage key 21. A spring 29 normally holds the sleeve in the engaged position. A change gearwheel 30 meshing with the gearwheel 23 is secured to a transverse shaft 31 journalled in the apron piece 15 and web 13 and having secured to it a worm 32. A wormwheel 33 meshing with worm 32 is secured to the lower end of a vertical shaft 34 which extends upward through and is journalled in the boss 14 and is provided at its upper end with a dovetail-shaped head 35 having a slidable saddle 36 carrying a pin 37 located at substantially the same level as the work 8. Components 35, 36 and 37 will be understood to coact as a crank or eccentric with adjustable throw. A gib 38 and setscrew 39 provide means for clamping the saddle 36 in any desired position along the head 35. A slide 40 is slidably mounted on the transverse ways 12 of the saddle 11 and carries what is substantially a type of pantograph mechanism, comprising a yoke 41, a frame 42, termed the first frame, and connecting link 43. The yoke 41 is pivotally mounted on pins 44 secured to the slide 40, and carries on its upper end a pin 45 on which the connecting link 43 pivots, and is provided with a transverse platform 46 provided with longitudinal ways. The yoke 41 also has a downwardly extending leg 47, the front edge of which is straight. The frame 42 is pivotally mounted on pins 48 secured to the slide 40 and has an arm 49 carrying a pin 50, on which the connecting link 43 pivots. The upper part of frame 42 has ways 51, on which is slidably mounted a motor 52, driving a cutter 53 in juxtaposition to the work 8. Vertical adjustment of the motor 52 and cutter 53 is provided for by the stud 54 secured to the motor and the handwheel 55 threaded on the stud 54 and bearing on the endplate 56 attached to the top of frame 42. The frame 42 also has, at one side, arms 57 and 58, and a second frame or drill frame 59 is pivoted between these arms on pins 60. The drill frame 59 has slidably mounted on it a motor 61 driving a drill or other cutting tool 62. A handle 63 projecting through a slot in the drill frame 59 and attached to the motor 61 is provided for imparting sliding feed movement to the motor 61 and drill 62. The longitudinal distance between the centre line of the drill 62 and the centre line of the cutter 53, when the mechanism is in the position shown in Fig. 5, is equal to the pitch circumference of the pinion 19. The drill frame 59 is also provided at its free end with a vertically disposed face 64 in line with the axis of the motor 61 and drill 62. A tension spring 65 extends between a pin 66 secured to the drill frame 59 and a pin 67 secured to the frame 42. A clamp link 68 is fitted at one end on the pin 50 and is provided at the other end with a slot 69 which registers with a stud 70 secured to the yoke 41. The stud 70 is fitted with a nut 71 and washer 72 whereby the link 68 may be clamped. A vertical bar 73 is secured to the saddle 11. A carrier 74, slidably mounted on the bar 73, carries a pin 75, which is located in juxtaposition to the front edge of the leg 47 of the yoke 41. A setscrew 76 provides means for locking the carrier 74 in any desired position along the bar 73. A spring 77 extending between the inner end of pin 45 and a spring support 78 secured to the saddle 11 tends to pivot the yoke 41 in such a manner that the front edge of its leg 47 normally presses on pin 75. An eccentric follower consisting of a longitudinally dsposed bar 79 is slidably supported on the yoke 41 on substantially the same level as the work 8, and has in its rear edge a notch 80 engaging the pin 37, and on its top surface a transverse groove 81. An arm 82, pivotally mounted on a pin 83 secured to the platform 46 of the yoke 41, is provided with a slot 84, and is fitted with a downwardly extending pin 85 engaging the groove 81 in the bar 79. Another downwardly extending pin 86 can be clamped in any position along the slot 84 by means of the nut 87 and washer 88. Another longitudinally disposed bar 89 is slidably mounted on the ways of the platform 46 of the yoke 41 and has a pin 90 which contacts and controls the location of the vertically disposed surface 64 of the drill frame 59, and is provided with a transverse groove 91 which is engaged by the end of pin 86. It will be understood that bars 79 and 89, in conjunction with arm 82 and its attachments, act as an adjustable motion-reducing mechanism, the longitudinal movement of the bar 79 relative to yoke 41 being transmitted to the bar 89 reduced in an adjustable ratio. The mechanism is so arranged that when positioned as shown in Fig. 5 with the head 35 at right angles to the line of the ways 2, the arm 82 and the axis of the motor 61 are also at right angles to the line of the ways 2.

Referring to Figs. 6 and 7, which are merely illustrative of the type of work which may be performed by a machine in accordance with this invention, the line O—X is the centre line of the symmetrical strake 8, $y$ is the measurement from the edge of the strake to the line O—X and $x$ is the measurement from the origin O located at the end of the strake. The edge of the strake is shaped according to the equation $$y = A \sin(Bx+C) + Dx + E$$

where A, B, C, D and E are constants whose values are chosen according to the circumstances of design and some of which, of course, may be zero or negative. It will be understood that these constants have the meaning normally attached to the use of such constants in a mathematical formula of this nature and that the constant A determines the amplitude of the sine wave, the constant B determines the length of the sine wave, the constant C relates to the position of the sine wave as regards its distance from the origin O, the constant D relates to a uniform degree of slope in respect to the axis O—X, this uniform slope being superimposed on the variable slope of the sine wave, and the constant E relates to the position of the sine wave as regards its distance from the axis O—X, and where these constants are used hereinafter in this specification they are to be understood as having the same meanings as are here indicated. In the present example, it will be assumed for purposes of illustration that the constant C is zero so that $Bx+C$ is equal to zero at one end of the strake and also that the constant B is such that $Bx+C$ (expressed in radians) is equal to $\pi$ at the other end of the strake. That is to say that, in the particular case considered, $B=\pi/L$, where L is the length of the strake, and $C=0$. The edges of the strakes are bevelled at an angle $\alpha$, and for the purposes of this example, it is assumed that $\alpha$ is to be such that $\tan \alpha$ equals $F \sin(Bx+C)$, where F is a constant, over that portion of its length where $Bx+C$ lies between zero and $\pi/2$, and is to be such that $\tan \alpha$ equals F over that portion of its length where $Bx+C$ lies between $\pi/2$ and $\pi$. The strakes are also provided with holes 92 drilled in the edges, these holes being spaced at equal longitudinal intervals and each hole being perpendicular to the surface of the edge at the position where it is located. The use of strakes of this general type for assembly to form the bilge portion of the hull of a boat is described in another patent application (Serial No. 550,741, filed August 23, 1944) by the present inventor, this application having issued as Patent No. 2,397,049, dated March 19, 1946.

Referring to Fig. 8, a cross section of a strake alternative to that shown in Fig. 7 is formed with tongue 93 and groove 94, also cut at an angle of bevel $\alpha$.

To exemplify the operation of the machine, it is assumed in the following description that it is desired to profile and drill a strake of the type described with reference to Figs. 6 and 7. The initial position in such a case is substantially as shown in Figs. 1, 2 and 3 and the set up may be prepared as follows:

The machine is fitted with a pair of change gearwheels 23 and 30 of such ratio that the wormwheel 33 will rotate 180° (or $\pi$ radians) when the saddle 11 is traversed longitudinally, by means of the rack and pinion gear, a distance equal to the length of the strake. The saddle 36 is locked on the dovetail 35 in such a position that the axis of the pin 37 is eccentric from the shaft 34 by an amount equal to A. The carrier 74 is then located in such a position that the ratio of A to the vertical distance between the bar 79 and pin 75 is equal to F. The work 8 is then located on table 4 and held down by the clamps 5. The location of the work should be such that, in the position of the machine mechanism shown in Figs. 1, 2 and 3, the cutter should be opposite the end of the strake and distant from the intended centre line thereof by a distance equal to E, and the intended centre line should slope towards the back of the machine in relation to the line of the longitudinal ways 2 and 3 by an amount of slope per unit length equal to D. This setting does not theoretically result in work in strict mathematical accordance with the formula, but the approximation thereto is extremely close in practical cases where D is small. The setting is now complete for the operation of profiling the edge of the strake.

It will be understood that the tension of spring 77 pulling on pin 45 tends to pivot the yoke 41 in such a manner that the front of its leg 47 is constantly pressed against pin 75, provided that the clamp link 68 is unclamped; moreover, the horizontal component of the tension of the spring, assisted by the pressure exerted between the pin 75 and leg 47 tends to move the slide 40 along the ways 12 towards the back of the machine so that the position taken up by the slide is such that the notch 80 of bar 79 is continuously maintained in contact with the pin 37. Owing to the action of the pantograph mechanism the cutter 53 receives the same transverse movement as the bar 79 and is also deflected from the vertical to the same extent as the yoke 41.

In operating the machine to profile the edge of the work 8, the handwheel 24 is rotated clockwise in front view to traverse the saddle 11 and its attached mechanism to the left along the ways 2 and 3 by the action of the pinion 19 and rack 9. During the first portion of this traverse the clamp link 68 is free. As the traverse proceeds the shaft 34 and the mechanism secured thereto is rotated clockwise in plan view by means of the gearwheels 23 and 30, worm 32 and wormwheel 33, so that the pin 37, acting on the bar 79, causes this bar, and therefore also the cutter 53, to move progressively towards the front of the machine, and at the same time the yoke 41 is progressively tilted owing to its pivotal action around the pin 75 and this angle of tilt is also communicated to the cutter 53 through the action of the pantograph mechanism. The traverse proceeds in this manner until the shaft 34 has turned through a right angle, bringing the mechanism to the position shown in Figs. 4 and 5 with the pin 37 at its maximum frontward position, whereupon the pantograph mechanism is locked by clamping the clamp link 68 by tightening the nut 71, and the traverse is then continued. During the second part of this traverse, therefore, the yoke 41 and cutter 53 remain at a constant angle of tilt, this angle of tilt remaining the same as in the positions shown in Figs. 4 and 5, while the leg 47 of yoke 41 moves away from the pin 75 as the yoke moves towards the back of the machine. At the same time the cutter 53 continues to receive the same transverse movement as the bar 79 receives through its contact with the pin 37, as the mechanism comprising the slide 40 and the attached pantograph mechanism and cutter moves bodily as a unit. Consideration of the geometry of the mechanism in conjunction with the initial settings previously referred to will show that the edge of the work is cut to a contour and to angles of bevel substantially as have been described with reference to Figs. 6 and 7. Thus whether the pantograph mechanism is locked or free, the cutter 53 receives the same frontward movement as the eccentric pin 37 and the frontward displacement of this pin (in relation to the longitudinal plane intersecting its axis of rotation) is seen to be $A \sin (Bx+C)$, as it is set at a radius equal to A and driven in the ratio previously specified, which, with the particular values of B and C chosen in the example, causes it to rotate $\pi$ radians while the cutter travels the length of the strake. The distance between the centre line of the strake and the edge of the work at the position where $x=$zero has been set at dimension E, and the slope of the centre line of the strake with reference to the line of travel of the carriage has been set at the value D, so that, adding these terms, the final profile of the cut edge of the strake with reference to this centre line is seen to be substantially in accordance with the equation $$y = A \sin (Bx+C) + Dx + E$$

Moreover, during such time as the pantograph mechanism is free to pivot, the tangent of the angle of tilt $\alpha$ is seen to be the ratio of the frontward displacement of the pin 37 (in relation to the longitudinal plane intersecting its axis of rotation) to the vertical distance between the bar 79 and pin 75, which, with the settings specified, is seen to be $F \sin (Bx+C)$ so that over that portion of the length of the strake where the pantograph mechanism was left free to pivot, that is to say over that portion of its length where $Bx+C$ lies between zero and $\pi/2$, the angle of bevel $\alpha$ to which the strake edge was cut was such than $\tan \alpha$ was equal to $F \sin (Bx+C)$. After the pantograph mechanism was locked the tangent of the angle of bevel remained at $F \sin \pi/2$ and, since $\sin \pi/2$ is equal to 1, $\tan \alpha$ is seen to be equal to F over that portion of the strake. In considering the initial setting of the machine for the purpose of drilling the holes 92 in the work 8, as described with reference to Figs. 6 and 7, it is assumed that the saddle 11 has been returned to the same end of the bed as that from which the profiling operation was commenced, but in such a position that the drill 62 is opposite the end of the work, that the clamp link 68 has been unclamped, and that the handwheel 55 has been operated to raise the motor 52 so that the cutter 53 is clear of the work 8. In this position the mechanism driven through the change gearwheels 23 and 30 will not be in the same position as is shown in Figs. 1, 2 and 3; that is to say not in the same position as when the cutter 53 was opposite the end of the work, as the saddle 11 is now in a longitudinal position differing from that shown in Figs. 1, 2 and 3 to the extent of the longitudinal distance between the axes of the cutter 53 and drill 62, which has previously been stated as being equal to the pitch circumference of the pinion 19. It is evident, therefore, that the position of the mechanism driven through the change gearwheels 23 and 30 differs from that shown in Figs. 1, 2 and 3 to an extent equivalent to that produced by one revolution of the handwheel 24, and to compensate for this the sleeve 25 is pulled forward by its handle 26 so that the slot in its end disengages the key 21, and the handwheel 24 is turned through one revolution, returning the mechanism driven through the change gearwheels 23 and 30 to the position shown in Figs. 1, 2 and 3, while leaving the saddle 11 in such longitudinal position that the drill 62 instead of the cutter 53 is opposite the end of the work 8. The sleeve 25 is then allowed to re-engage the key 21. The pin 86 is now adjusted and secured in such a position along the slot 84 of arm 82 that the ratio of reduction of the motion-reducing mechanism linking the bars 89 and 79 is such that the ratio of movement of bar 89 to that of bar 79 is equal to the distance between the axes of pins 90 and 60 multiplied by the constant B. The other adjustments of the machine are left the same as in the profiling operation.

In the operation of edge-drilling the work, the handwheel 24 is operated to traverse the saddle and its attached mechanism until the end of bar 16 is opposite one of the gaps between the bars 10, whereupon knob 17 is pushed inward so that the end of bar 16 enters the gap, thus locating and fixing the position of the saddle 11. The drill 62 is then operated to drill the edge of the work by moving the motor 61 along its slides by means of the handle 63, thus feeding the drill into the work. Succeeding holes are drilled in a similar manner, longitudinal location being made at successive gaps between the bars 10. As in the case of the profiling operation, the pantograph mechanism is locked by clamping the clamp link 68 when the pin 37 reaches its maximum frontward position, and the drilling process is carried out over the remaining length of the work with the pantograph mechanism locked.

As the longitudinal traverse proceeds the movement of the pin 37 engaging the notch 80 in the bar 79 causes longitudinal movement of this bar to the left relatively to the yoke 41, and by the action of the motion-reducing mechanism, comprising the groove 81, pin 85, arm 82, pivot 83, pin 86 and groove 91, causes a similar but reduced longitudinal movement of the bar 89. The pin 90 secured to bar 89 and pressing on the face 64 of the drill frame 59 causes angular movement of the drill frame, and of the motor 61 and drill 62 mounted thereon, about the pins 60.

It will be understood that the drill 62 is subject to the same amount of tilt in a vertical plane at each drilling position as was imparted to the cutter 53 at the same longitudinal position during the profiling operation, so that perpendicularity of each hole to the profiled edge surface of the work is assured in the vertical plane. Also it is the property of the curve $y = A \sin (Bx+C)$ that its slope $dy/dx$ at any point is equal to $$AB \cos (Bx+C)$$

The longitudinal displacement of bar 79 from its central position, measured relatively to the yoke 41, is seen to be equal to $A \cos (Bx+C)$, and, owing to the adjustment mentioned in relation to the position of pin 86, the displacement of bar 89 and pin 90 is equal to $AB \cos (Bx+C)$ multiplied by the distance between the axes of pins 90 and 60, so that as the drill frame 59 pivots about the pins 60 the slope of the drill in the horizontal plane (referred to an axis perpendicular to the line of the ways 2) is equal to $$AB \cos (Bx+C)$$

as is required. Hence substantial perpendicularity of each hole to the profiled surface of the work in the horizontal plane, as well as in the vertical plane, is assured.

In the case of work which is intended to be symmetrical about the centre line, the other edge of the work is profiled and drilled in a generally similar manner. After completing the first edge the work is turned end for end with the same side up and is re-located. The operations of profiling and drilling may then be carried out in substantially the same manner as before, but using a direction of longitudinal traverse opposite to that employed in profiling and drilling the first edge.

In the profiling of work having tongue and groove edges, such as is shown in Fig. 8, no change in the profiling procedure is involved, the only difference lying in the use of formed cutters for cutting the tongue and groove instead of the plain cutter 53 used in forming work of section as shown in Fig. 7. Such formed cutters for cutting tongues and grooves and the like are well-known.

Various other types of cutter may also be employed without departing from the principle of the invention, and, where steel or the like is to be cut, an oxygen cutting jet may be used in place of a rotary cutter.

It will be understood that while mathematical expressions have been used in describing the shape of the work to be performed on the machine it is not suggested that the machine is capable of producing work in exact mathematical accordance with such expressions, as discrepancies both of theoretical and constructional character involve slight departures from such accuracy. With suitable precautions, however, which will be evident to those skilled in the art, the machine can be constructed to operate in accordance with the principles outlined to within a degree of accuracy sufficient for the intended purpose of the work.

By varying the initial settings of the machine a considerable variety of work may be performed, and, within the limits of its constructional dimensions, the machine is capable of cutting profiles substantially in accordance with the general formula $$y = A \sin (Bx+C) + Dx + E$$

such profiles including concave curves and straight lines as well as convex curves.

Cutting tools other than a drill may also be mounted on frame 59, or on another similar frame, to perform operations on the work, and in particular a small circular saw or a bandsaw may be mounted thereon to do a cutting operation. For example, a saw may be mounted on frame 59 to cut the work to size, and a finishing operation may, if so required, later be performed by the profile cutter 53. It will be understood that the movement of frame 59 is such as will guide a saw correctly in the line of the cut. It will also be understood that it is immaterial to the operation of the invention whether the table 4 is fixed and the carriage or saddle 11 moved, or the carriage 11 fixed and the table 4 moved, or both the carriage 11 and table 4 moved, as the necessary relative rectilinear movement between the carriage and the table may be produced in any of these ways.

I claim:

1. A machine for fabricating strakes for boat construction or the like having a table for supporting the work, a carriage mounted for rectilinear movement relative to said table, mechanism for producing said rectilinear movement, an eccentric geared to said mechanism, an engaging member secured to said carriage, a slide mounted on said carriage for movement transverse to the direction of said longitudinal movement, a member pivotally mounted on said slide and having an engaging surface capable of engaging said engaging member, an eccentric follower mounted on said pivotally mounted member and engaging said eccentric, a frame pivotally mounted on said slide, a cutting tool mounted on said frame, linkage co-acting with said frame, said slide and said pivotally mounted member to form a pantograph mechanism compelling movement of said cutting tool proportional to the transverse movement of said eccentric follower, a spring acting on said pantograph mechanism to maintain said eccentric follower in engagement with said eccentric and also normally to maintain said engaging surface in contact with said engaging member, and clamping means to lock said pantograph mechanism whereby said pantograph mechanism may also be caused to function as a rigid unit so that the action of said spring may, when so required, be rendered inoperative in maintaining said engaging surface in contact with said engaging member while remaining operative to maintain said eccentric follower in engagement with said eccentric.

2. A machine for fabricating strakes for boat construction or the like having a longitudinal table to support the work, longitudinal ways, a saddle slidably mounted on said ways, mechanism to move said saddle, an eccentric rotatably mounted on said saddle, gearing connecting said eccentric to said mechanism, a slide capable of transverse sliding movement mounted on said saddle, an engaging member secured to said saddle, a member pivotally mounted on said saddle and having an engaging surface capable of engaging said engaging member, an eccentric follower mounted on said pivotally mounted member and engaging said eccentric, a frame pivotally mounted on said slide and carrying a cutting tool, a link connecting said frame to said pivotally mounted member, a spring acting to maintain said eccentric follower in engagement with said eccentric and also normally to maintain said engaging surface in contact with said engaging member, and clamping means to inhibit pivoting movement of said pivotally mounted member and said frame whereby the action of said spring may, when so required, be rendered inoperative in maintaining said engaging surface in contact with said engaging member while remaining operative to urge said slide and so maintain said eccentric follower in engagement with said eccentric.

3. A machine for fabricating strakes for boat construction or the like having a longitudinal table to support the work, longitudinal ways, a saddle mounted on said longitudinal ways for longitudinal rectilinear movement relative to said table, mechanism to move said saddle, an eccentric rotatably mounted on said saddle, gearing connecting said mechanism to said eccentric, a slide mounted on said saddle for movement in a direction transverse to the direction of said longitudinal rectilinear movement, a frame mounted on said slide, a cutting tool mounted on said frame, an eccentric follower engaging said eccentric, a mounting for said eccentric follower supported on said slide, and connecting means coupling said frame with said mounting.

4. A machine for fabricating strakes for boat construction or the like having a longitudinal table to support the work, longitudinal ways, a saddle mounted on said longitudinal ways for longitudinal rectilinear movement relative to said table, mechanism to move said saddle, an eccentric rotatably mounted on said saddle, gearing connecting said mechanism to said eccentric, a slide mounted on said saddle for movement in a direction transverse to the direction of said longitudinal rectilinear movement, a cutting tool mounted on said slide, a mounting supported by said slide and an eccentric follower slidably mounted on said mounting for longitudinal movement and provided with a recess for engaging said eccentric.

5. A machine for fabricating strakes for boat construction or the like having a longitudinal table to support the work, longitudinal ways, a saddle mounted on said longitudinal ways for longitudinal rectilinear movement relative to said table and having an engaging member secured thereto, mechanism to move said saddle, an eccentric rotatably mounted on said saddle, gearing connecting said mechanism to said eccentric, a slide mounted on said saddle for movement in a direction transverse to the direction of said longitudinal rectilinear movement, a frame member mounted on said slide for pivotal movement about an axis substantially parallel to the direction of said longitudinal rectilinear movement, a rocking member also mounted on said slide for pivotal movement about an axis substantially parallel to the direction of said longitudinal rectilinear movement and provided with engaging means for engaging said engaging member, a cutting tool mounted on said frame member, an eccentric follower mounted on said rocking member and engaging said eccentric, and a link having its one end pivotally secured to said frame member and its other end pivotally secured to said rocking member.

6. A machine for fabricating strakes for boat construction or the like having a longitudinal table to support the work, longitudinal ways, a saddle mounted on said longitudinal ways for longitudinal rectilinear movement relative to said table and having an engaging member secured thereto, mechanism to move said saddle, an eccentric rotatably mounted on said saddle, gearing connecting said mechanism to said eccentric, a slide mounted on said saddle for movement in a direction transverse to the direction of said longitudinal rectilinear movement, a member pivotally mounted on said slide and having engaging means for engaging said eccentric and said engaging member, a cutting tool pivotally mounted on said slide, means connecting said pivotally mounted member to said cutting tool and compelling movement of said cutting tool on movement of said pivotally mounted member, and clamping means to optionally lock said pivotally mounted member rigid with said slide to prevent pivotal movement of said pivotally mounted member.

7. A machine for fabricating strakes for boat construction or the like having a longitudinal table to support the work, longitudinal ways, a saddle mounted on said longitudinal ways for longitudinal rectilinear movement relative to said table and having an engaging member secured thereto, mechanism to move said saddle, an eccentric rotatably mounted on said saddle, gearing connecting said mechanism to said eccentric, a slide mounted on said saddle for movement in a direction transverse to the direction of said longitudinal rectilinear movement, a rocking member pivotally mounted on said slide and having engaging means for engaging said eccentric and said engaging member, a frame pivotally mounted on said slide and supporting a cutting tool, pivots located on said rocking member and said frame spaced at a distance from their axes of pivoting on said slide, and a link connecting said pivots; said link, slide, rocking member and frame coacting to form a pantograph linkage.

8. A machine for fabricating strakes for boat construction or the like having a table for supporting the work, a saddle mounted for rectilinear movement relative to said table, mechanism for producing said rectilinear movement, a slide mounted on said saddle for movement in a direction transverse to the direction of said rectilinear movement, a frame mounted on said slide for pivotal movement about an axis substantially parallel to the direction of said rectilinear movement, a cutting tool mounted on said frame, locking means between said frame and said slide for optionally locking said frame to form a rigid unit with said slide, an eccentric rotatably mounted on said saddle, gearing connecting said eccentric to said mechanism, and means mounted on said slide and connecting said eccentric to said frame and compelling movement thereof on movement of said eccentric, said movement being restricted to non-pivotal movement of said frame as a rigid unit with said slide when said locking means is engaged to prevent pivotal movement of said frame.

9. A machine for fabricating strakes for boat construction or the like having a longitudinal table to support the work, longitudinal ways, a saddle mounted on said longitudinal ways for longitudinal rectilinear movement relative to said table, mechanism to move said saddle, an eccentric rotatably mounted on said saddle, gearing connecting said mechanism to said eccentric, a slide mounted on said saddle for movement in a direction transverse to the direction of said longitudinal rectilinear movement, a first frame mounted on said slide for movement in a direction transverse to the direction of said longitudinal rectilinear movement, a second frame mounted on said first frame for pivotal movement about an axis located in a plane transverse to the direction of said longitudinal rectilinear movement, a cutting tool supported by said second frame, a mounting supported on said slide, an eccentric follower slidably mounted on said mounting for longitudinal movement, connecting means coupling said first frame with said mounting, and a motion-reducing mechanism engaged by said eccentric follower and engaging said second frame.

ALEXANDER G. S. SANDISON.

REFERENCES CITED

The following references are of record in the file of this patent:

UNITED STATES PATENTS

| Number | Name | Date |
|---|---|---|
| 282,831 | Aborn | Aug. 7, 1883 |
| 644,445 | Nerz | Feb. 27, 1900 |
| 645,164 | Dedrick | Mar. 13, 1900 |
| 799,825 | Behee | Sept. 19, 1905 |
| 1,130,454 | Wegner | Mar. 2, 1915 |
| 1,325,789 | Johnsson | Dec. 23, 1919 |
| 1,839,196 | Cameron | Jan. 5, 1932 |
| 1,969,740 | Fitzpatrick | Aug. 14, 1934 |
| 2,025,842 | Africano | Dec. 31, 1935 |
| 2,170,687 | Johnson | Aug. 22, 1939 |
| 2,345,494 | Onsrud | Mar. 28, 1944 |
| 2,366,831 | Cartledge | Jan. 9, 1945 |